United States Patent
Yang et al.

(10) Patent No.: US 6,298,949 B1
(45) Date of Patent: Oct. 9, 2001

(54) SAFETY BRAKE DEVICE FOR INFANT STROLLER

(75) Inventors: Cheng-Fan Yang, Tainan Hsien; Kuang-Neng Cheng, Chia-I Hsien, both of (TW)

(73) Assignee: Link Treasure Ltd., Tortola (VG)

( * ) Notice: Subject to any disclaimer, the term of this patent is extended or adjusted under 35 U.S.C. 154(b) by 0 days.

(21) Appl. No.: 09/376,662

(22) Filed: Aug. 16, 1999

(51) Int. Cl.[7] .................................................. B62B 9/08
(52) U.S. Cl. ............................. 188/20; 188/19; 280/658
(58) Field of Search ................................ 188/20, 24.21, 188/2 D, 19; 280/642, 650, 657, 658, 47.38

(56) References Cited

U.S. PATENT DOCUMENTS

| | | | | |
|---|---|---|---|---|
| 353,870 | * | 12/1886 | Luburg ................................... | 188/20 |
| 422,245 | * | 2/1890 | Hanimann .............................. | 188/20 |
| 583,079 | * | 5/1897 | Parrett et al. ......................... | 188/20 |
| 716,717 | * | 12/1902 | Jones ..................................... | 188/20 |
| 784,443 | * | 3/1905 | Starbard ................................ | 188/20 |
| 995,480 | * | 6/1911 | Phalp .................................... | 188/20 |
| 1,709,527 | * | 4/1929 | Ford ..................................... | 188/20 |
| 1,861,958 | * | 6/1932 | Gallinant ............................... | 188/20 |
| 2,425,574 | * | 8/1947 | Stewack ................................ | 188/20 |
| 5,370,408 | * | 12/1994 | Egan .................................... | 188/20 X |

FOREIGN PATENT DOCUMENTS

| | | | | |
|---|---|---|---|---|
| 5573 | * | of 1883 | (GB) ..................................... | 188/20 |
| 12233 | * | of 1892 | (GB) ..................................... | 188/20 |
| 767159 | * | 1/1957 | (GB) ..................................... | 188/20 |

* cited by examiner

Primary Examiner—Robert J. Oberleitner
Assistant Examiner—Melanie Torres
(74) Attorney, Agent, or Firm—W. Wayne Liauh

(57) ABSTRACT

A safety brake device for a stroller is disclosed. The brake device will automatically preclude the movement of the stroller when the user releases the brake handle. The brake handle is movably mounted to the stroller for being pushed down during manual propulsion of the stroller. A pulling wire connects to the brake handle for operating a brake assembly incorporating with the wheels. The brake handle is movable between a first and a second positions. In the first position without being handled by the user, the brake assembly precludes the rotation of the wheels. In the second position where the brake handle is pushed down by the user, the pulling wire actuates the brake assembly to release the brake and enables rotation of the wheels. When the user leaves the stroller, the brake handle retrieves to the first position, then the wheels are braked and precluded from rotation.

5 Claims, 7 Drawing Sheets

SAFETY BRAKE DEVICE FOR INFANT STROLLER

FIELD OF THE INVENTION

The present invention relates to a brake device, by which the motion of the stroller can be precluded when the user leaves the stroller, and more particularly to a safety brake device for a stroller which is controlled by changing the position of a push handle.

BACKGROUND OF THE INVENTION

The infant strollers for carrying babies or children are known in the prior arts. Many stroller products are in the market, including foldable strollers, single seat or twin seat strollers. Whatever the stroller is, it generally includes at least three free rotating wheels for easy moving of the stroller. The user can easily push the stroller moving by the wheels. But, when the baby staying in the stroller without an attendant or being held by the parent, the stroller is easy to be moved and cause danger to the baby or child staying therein, especially when the stroller stays on a slope or is unintentionally collided by others.

A common method for solving the aforementioned problem is to provide a brake device for the wheels. The brake of prior arts has to be intentionally operated by the user so as to restrain the wheel from rotation, and has to be released from braking before moving the stroller. But, such brake device is not safe enough to preclude the motion of the stroller if the user doesn't carefully or timely operate the brake when the stroller is supposed to stop moving and free from handling by the user. Accordingly, the stroller may move unintentionally and cause danger to the baby or the child staying therein.

To overcome the defects of the aforesaid brake device, a safety brake for stroller is disclosed by U.S. Pat. No. 5,713,585. The safety brake will automatically preclude the motion of the stroller by restricting rotation of the wheels when the attendant or user leaving the stroller. The safety brake includes a brake handle movably mounted to the push handle of the stroller for being grasped during manual propulsion of the stroller, and brake assemblies mechanically coupled to the brake handle for precluding the rotation of the wheels during absence of an attendant gripping the brake handle to preclude unintentional rolling of the stroller.

But the brake handle in the aforesaid patent has to be grasped upward to release the brake which is of the opposite direction of the push handle when the stroller has to be pushed down for lifting the front wheels during moving the stroller across stairs or obstacles. The opposite manipulation makes the obstacle-crossing more difficult.

SUMMARY OF THE INVENTION

Accordingly, the primary object of the present invention is to provide a brake device for stroller which will automatically preclude the motion of the stroller when the user release the brake handle. Particularly, the brake handle is just the push handle which can be released to activate the brake when the user leaves the stroller.

The secondary object of the present invention is to provide a brake device for stroller in which the brake handle is released by being pushed downward. Therefore, it is easier to be handled when the stroller is pushed down for moving across obstacles.

To attain this, the brake device according to the present invention includes a brake handle, i.e. the push handle of the stroller, which is movably mounted to the stroller for being pushed down during manual propulsion of the stroller. A pulling wire connects to the brake handle for operating a brake assembly incorporating with the wheels. The brake handle is movable between a first and a second positions. In the first position without being handled by the user, the brake assembly precludes the rotation of the wheels. In the second position where the brake handle is pushed down by the user, the pulling wire pulls the brake assembly to release the brake and enables rotation of the wheels. When the user leaves the stroller, the brake handle retrieves to the first position, then the wheels are braked to be precluded from rotation.

BRIEF DESCRIPTION OF THE DRAWINGS

The above objects and advantages of the present invention will become more apparent from the following detailed description of the present invention when taken in conjunction with the accompanying drawings.

DESCRIPTION OF THE PREFERRED EMBODIMENT

Figure 1:
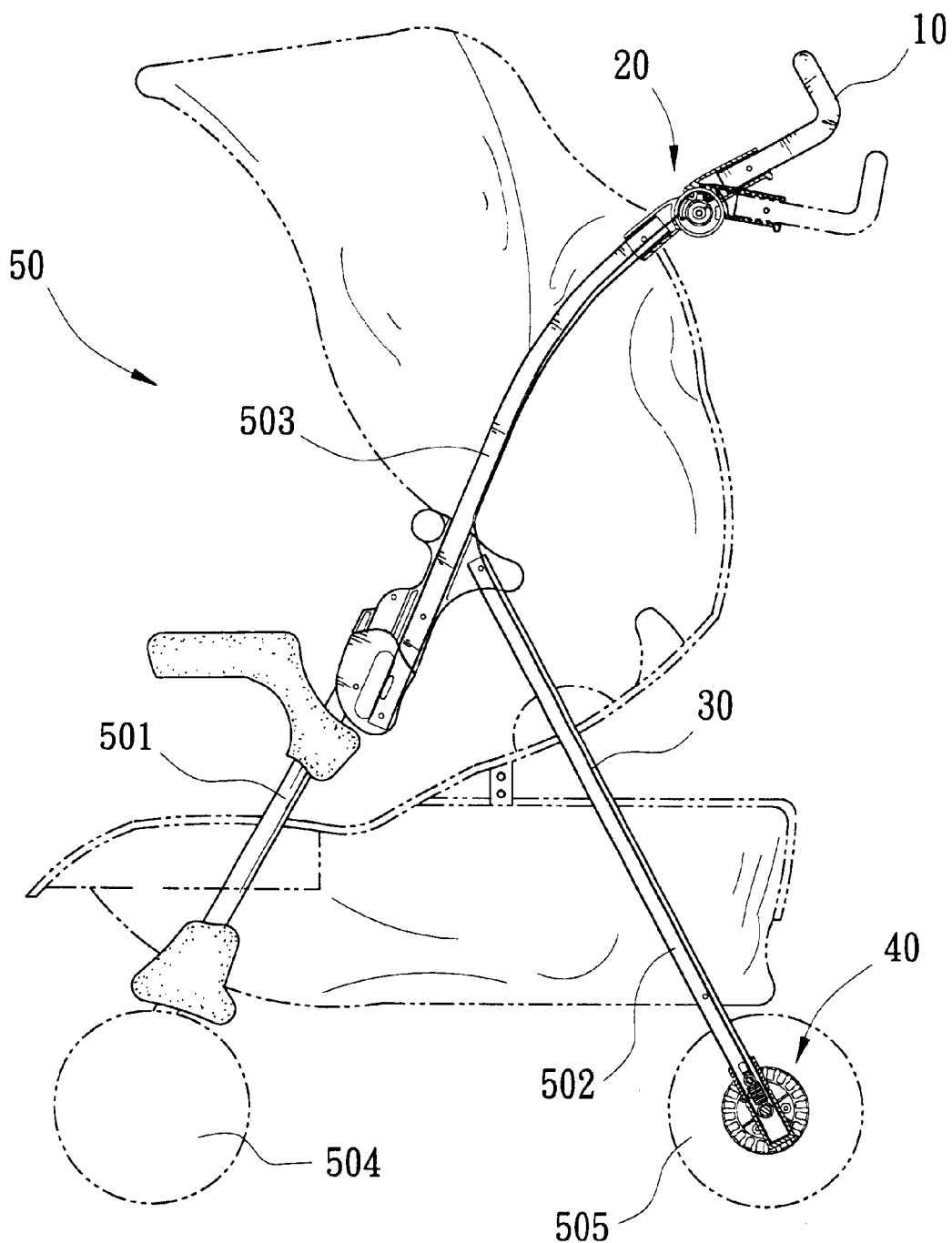
FIG. 1 is an exemplary view of a brake device of stroller according the present invention.

With reference to FIG. 1, a stroller 50 to be incorporated with the brake device of the present invention includes a front frame 501, a rear frame 502 and a handle frame 503. Front wheels 504 and rear wheels 505 are further mounted on the lower ends of the front frame 501 and the rear frame 502.

Figure 2:
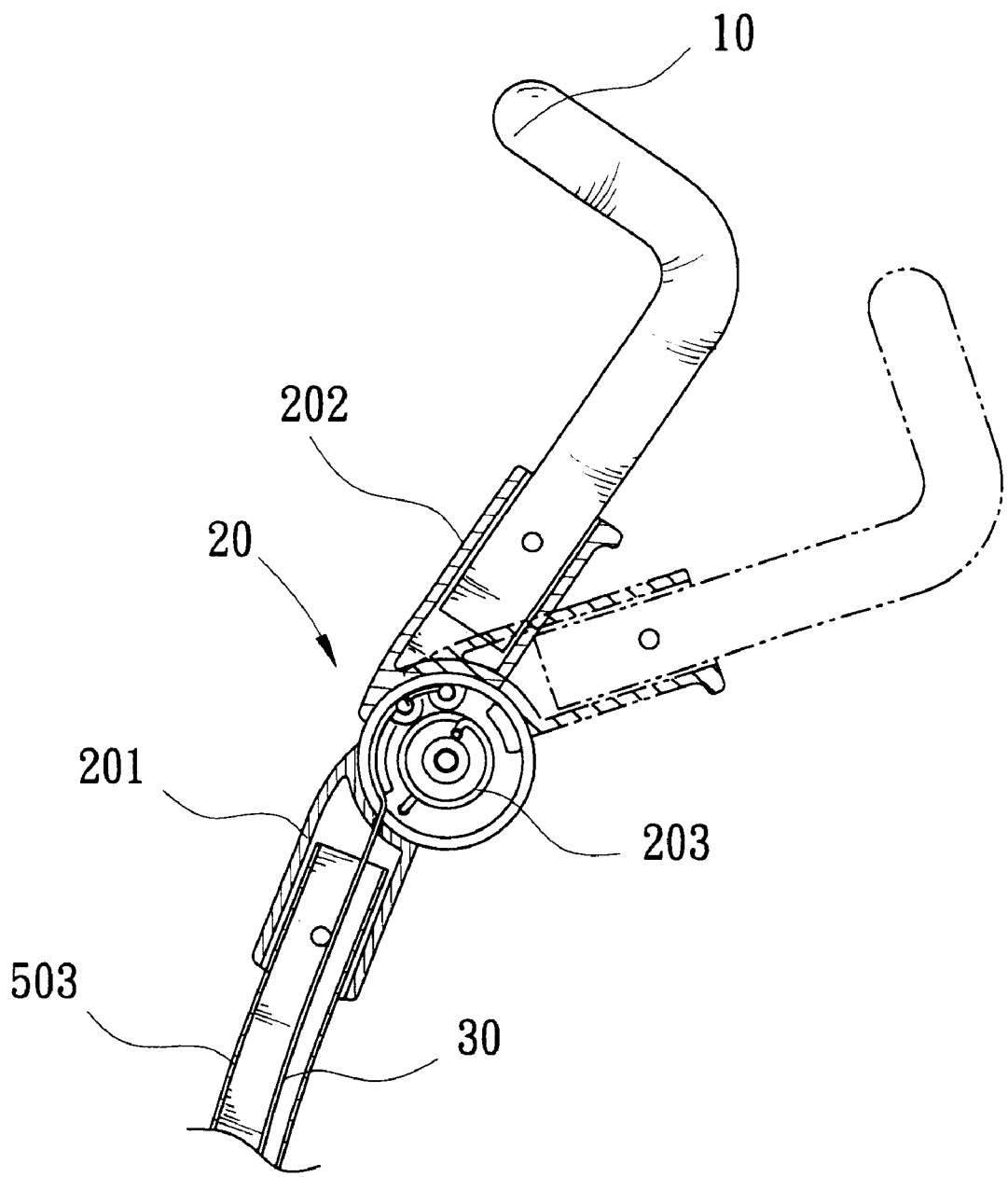
FIG. 2 is an enlarged sectional view of the brake handle portion of the present invention.

Referring now to FIGS. 1 and 2, the brake device of the present invention includes a handle 10, a joint 20, a pulling wire 30 and a brake assembly 40. The joint 20 is composed of a first arm 201 and a second arm 202 which are pivotally linked. The first arm 201 is fixed to the handle frame 503, while the second arm 202 is fixed to the handle 10. In a normal condition, the second arm 202 is retained by a spring 203 to keep in a straight line with the first arm 201 so as to stay in a first position. When the handle 10, i.e., the second arm 202, is forced by the user to swing downward with an angle to the first arm 201, it reaches a second position. After the user's force is removed, the handle 10 retrieves to the first position by the force of the spring 203 automatically.

Figure 3:
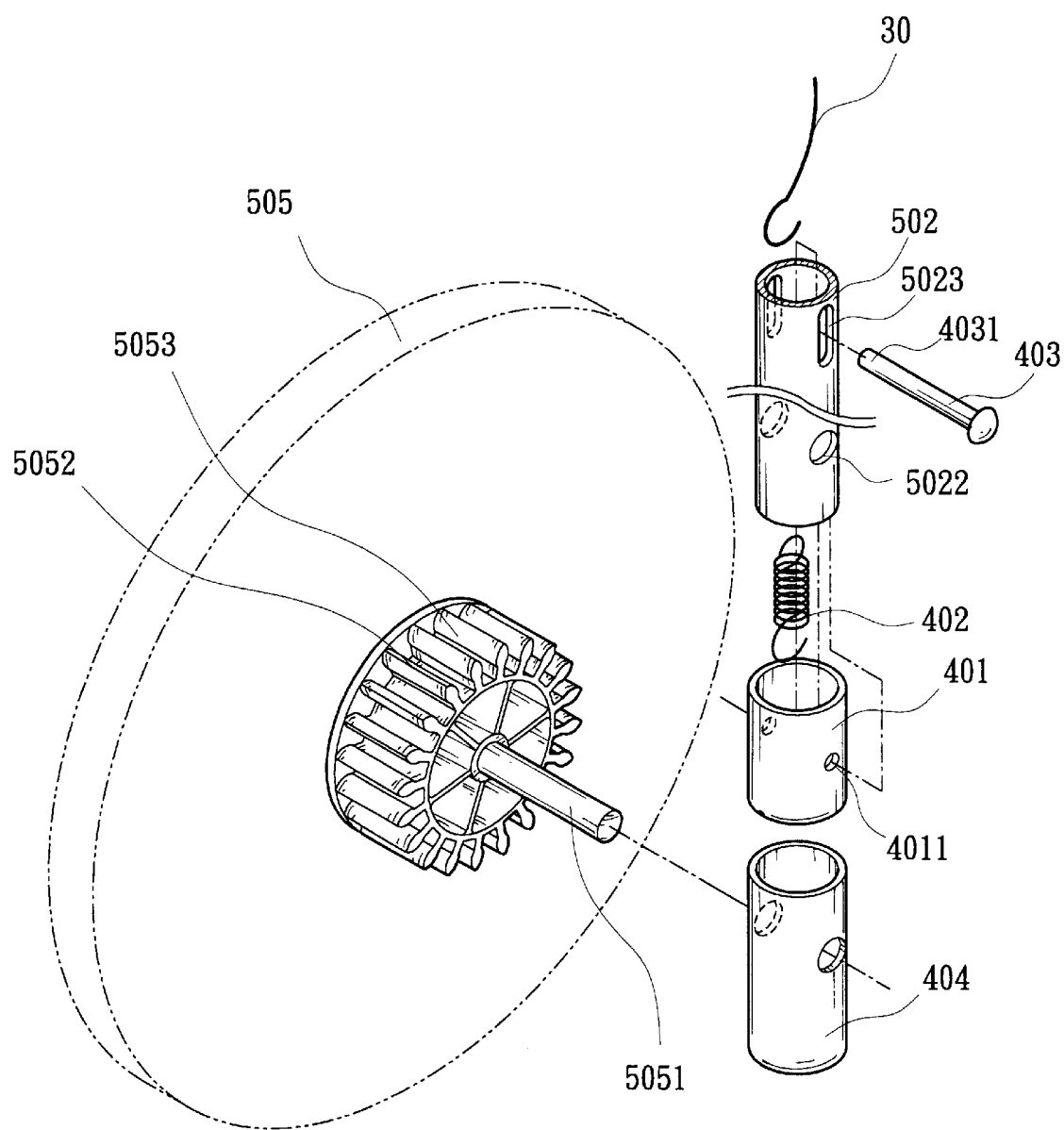
FIG. 3 is an exploded view of the brake assembly portion of the present invention.
Figure 4A:
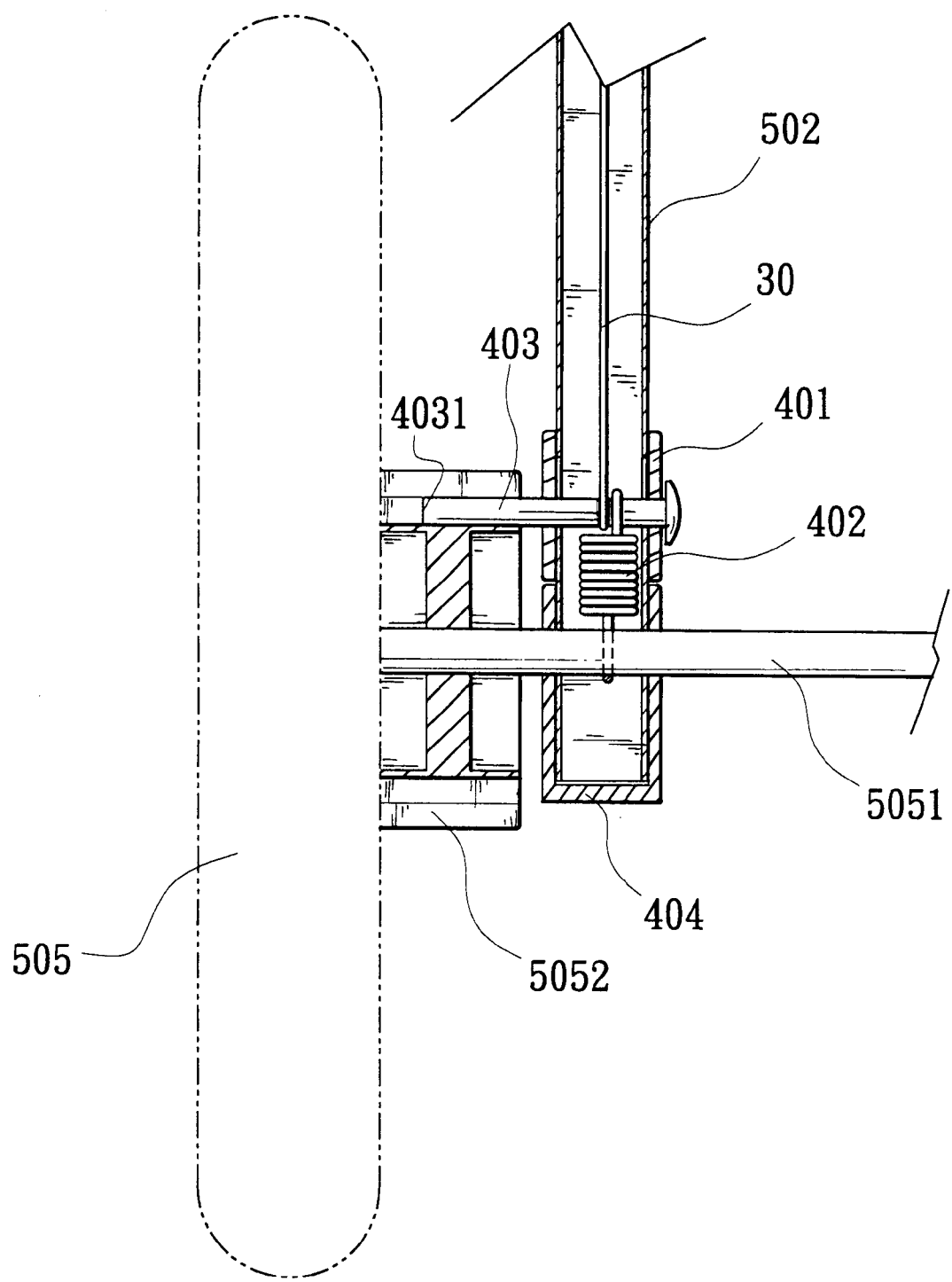
FIG. 4A is an explanatory sectional view of the brake assembly of the present invention.
Figure 4B:
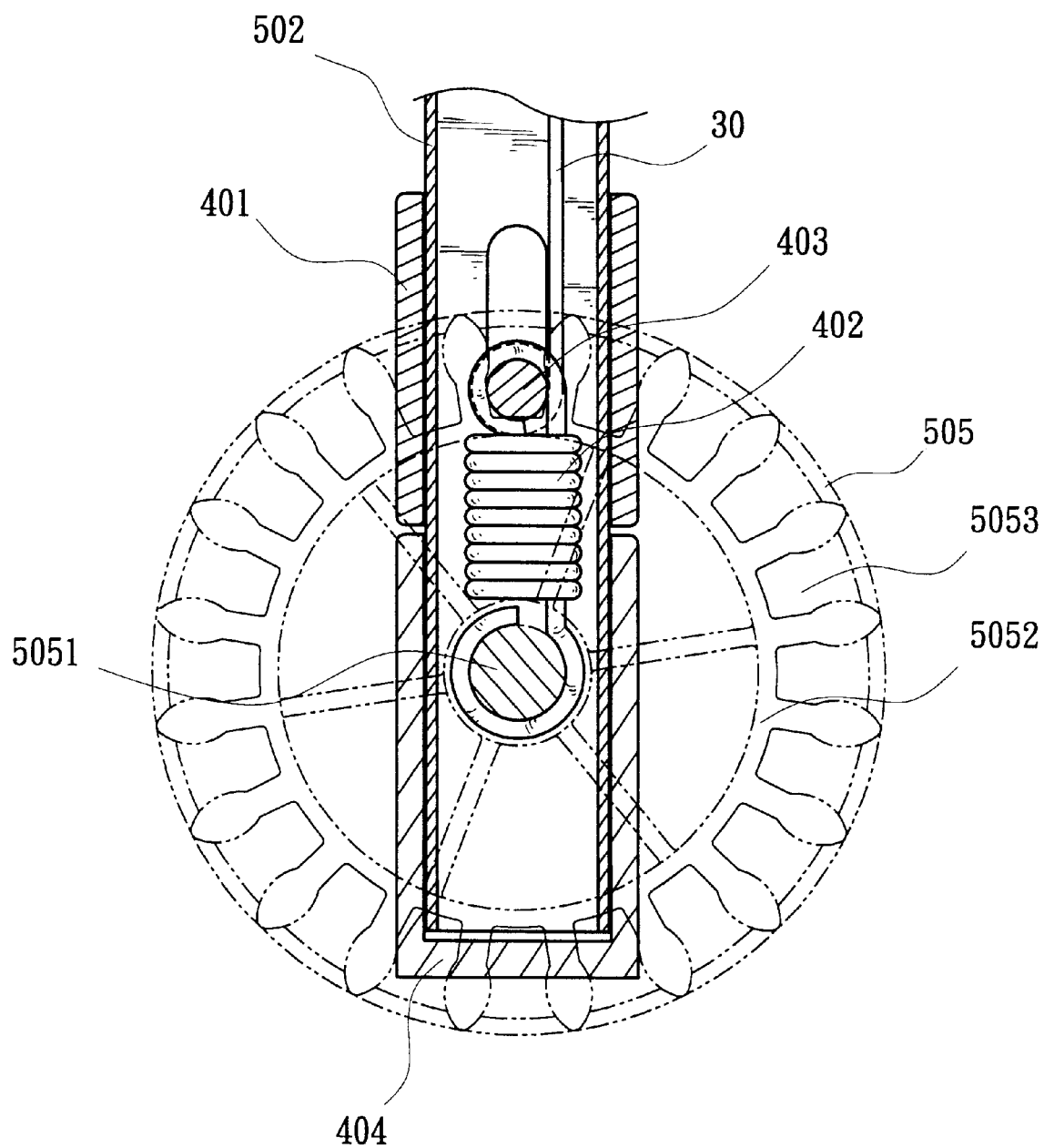
FIG. 4B is an elevation view of FIG. 4A.
Figure 5A:
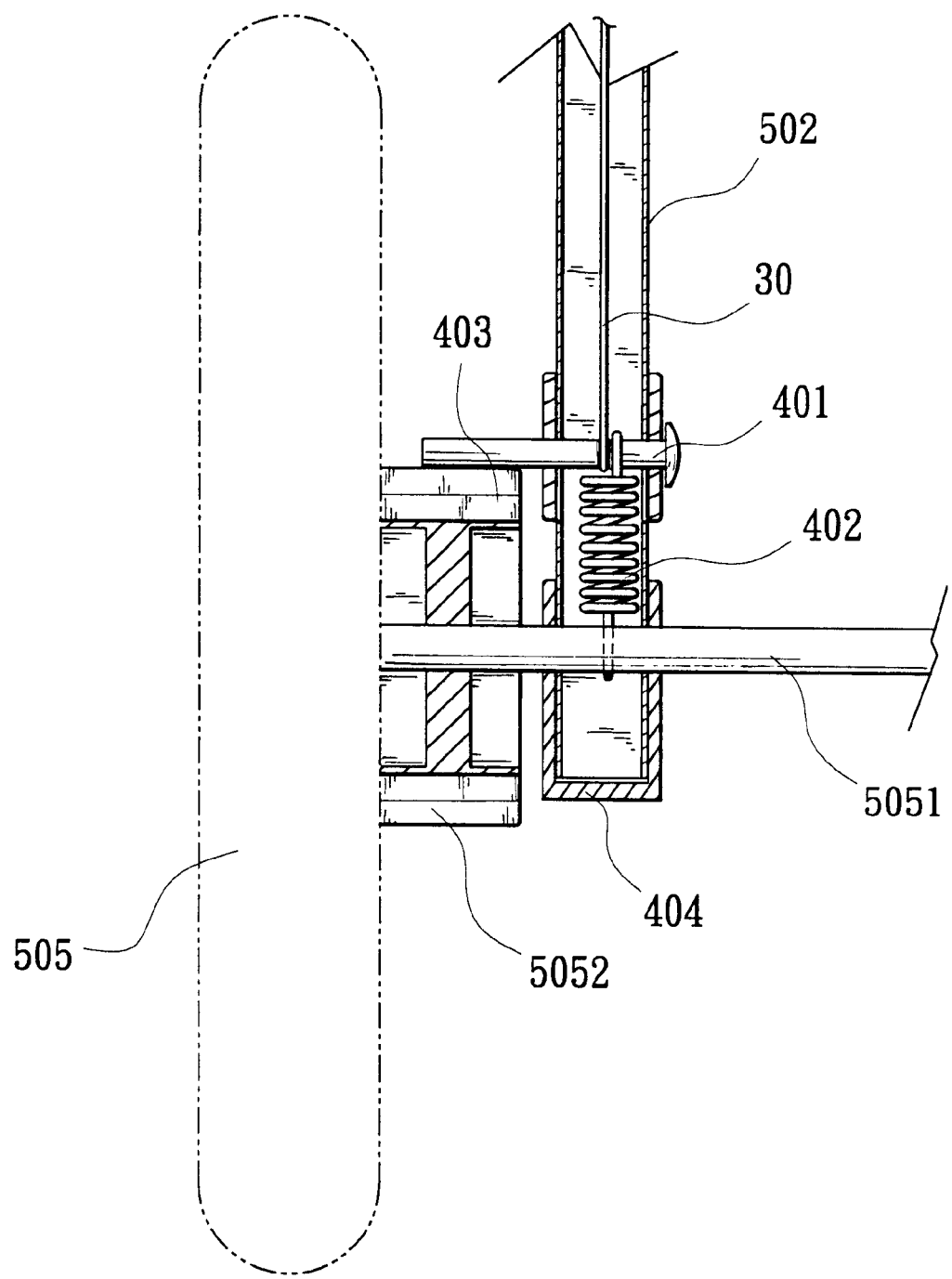
FIG. 5A is another explanatory sectional view of the brake assembly of the present invention.
Figure 5B:
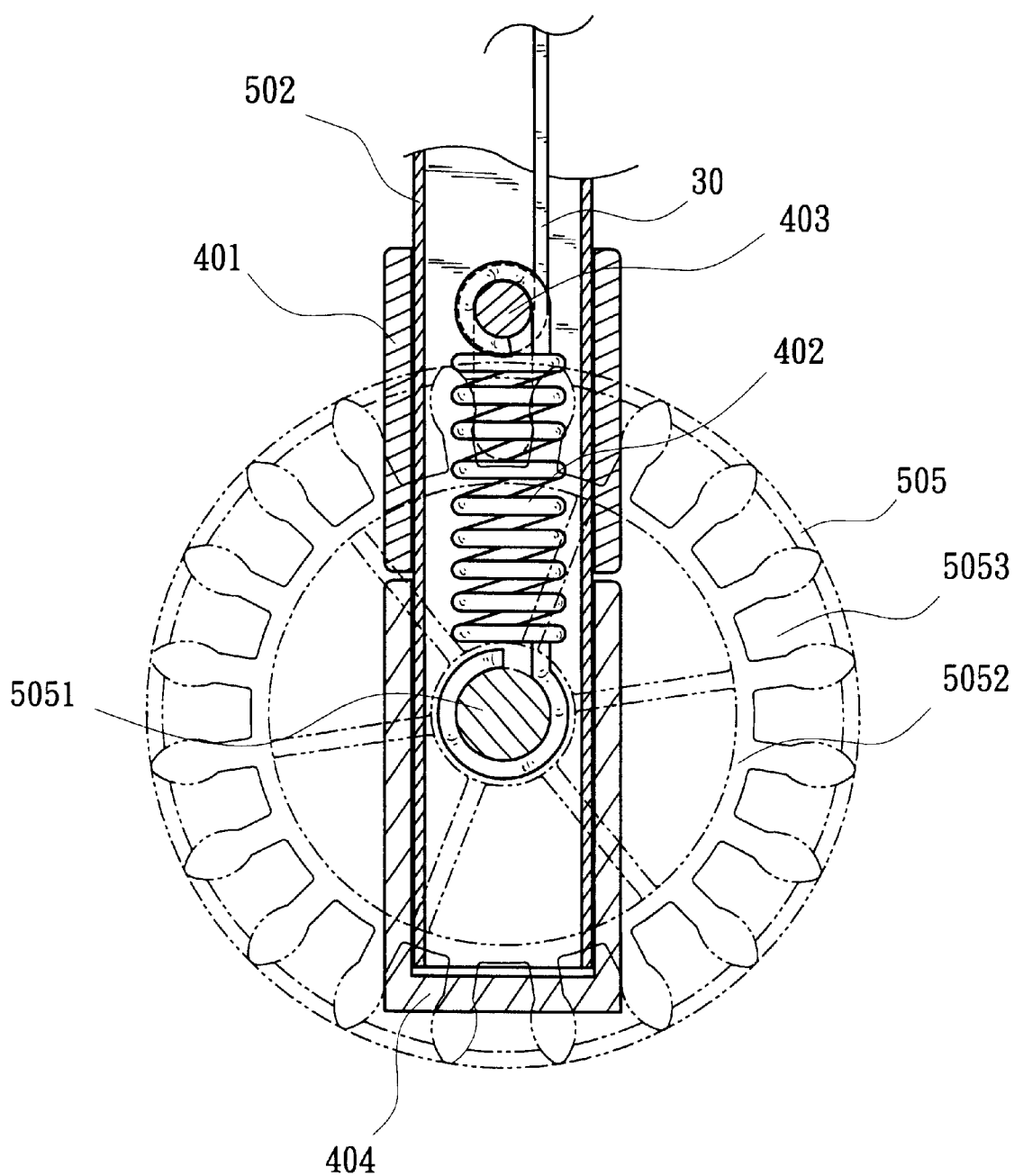
FIG. 5B is an elevation view of FIG. 5A.

As shown in FIG. 3, the brake assembly 40 is mounted on the rear frame 502 near the rear wheel 505. It consists of a slidable sleeve 401, a resilient element 402, a brake bar 403 and a fixed sleeve 404. The rear frame 502 is formed with a pivotal hole 5022 on the end thereof for mounting the axle 5051 of the rear wheel 505. There is further a slot 5023 corresponding to the brake bar 403. The slidable sleeve 401 of the brake assembly 40 is slidably mounted on the rear frame 502. On the slidable sleeve 401, there is a corresponding hole 4011 for fixing the brake bar 403. The brake bar 403 penetrates through the hole 4011 of the slidable sleeve 401 and the slot 5023 of the rear frame 502 to make the slidable sleeve 401 movable on the slot 5023 of the rear frame 502.

The brake bar 403 located at the bottom end of the slot 5023 is defined as a first position, while at the top end thereof is defined as a second position. The fixed sleeve 404 is mounted on the rear frame 502 for stopping the slidable sleeve 401. As shown in 4A, 4B, 5A and 5B, the resilient element 402 installed between the brake bar 403 and the axle 5051 forces the brake bar 403 normally positioning in the first position of the slot 5023. A plurality of grooves 5053 are formed on the brake block 5052. When the brake bar 403 is at the first position, the end portion 4031 of the brake bar 403 locates in the groove 5053 to preclude the rear wheel 505 from rotation such that defines the braking position of the stroller 50. Alternatively, when the brake bar 403 moves from the first position to the second position, the end portion 4031 of the brake bar 403 is away from the groove 5053 to free the rear wheel 505 to rotate such that defines the releasing position of the stroller 50.

One end of the pulling wire 30 connects to the brake bar 403 for moving it from the first position to the second position. The other end of the pulling wire 30 connects, along the rear frame 502 and the handle frame 503, to the second arm 202 of the joint 20. When the second arm 202 moves from the first position to the second position, it pulls the wire 30 and moves the brake bar 403 from the first position to the second position.

As described above, the brake bar 403 of the brake assembly 40 normally precludes the rear wheel 505 from rotation due to the force of the resilient element 402. When the user wants to release the rear wheel 505 so as to move the stroller, he or she just has to push the handle 10, i.e., the second arm 202 of the joint 20, to move the handle 10 from the first position to the second position where the pulling wire 30 will pull the brake bar 403 moving upward from the first position to the second position, i.e., leaving the end portion 4031 of the brake bar 403 from the groove 5053 of the brake block 5052 of the rear wheel 505. As the brake bar 403 releases the groove 5053, the rear wheel 505 is free to rotate, and the stroller 50 can be moved by the user. Whenever the user's hands leave the handle 10, the handle 10 will retrieve from the second position to the first position, and the brake bar 403 also retrieves from the second position to the first position and precludes the rear wheel 505 from rotation.

The safety brake device according to the present invention has at least the following advantages:

a) The brake device is automatically activated when the user's hands leave the handle of the stroller, which can ensure the safety of braking the stroller when the user doesn't handle the stroller; and b) The function of the brake device is directly controlled by changing the position of the push handle, whereby no other elements are further needed.

While the invention has been described in its preferred embodiments, it is to be understood that the words which have been used are words of description rather than limitation and that changes within the purview of the appended claims may be made without departing from the true scope and spirit of the invention.

What is claimed is:

1. A brake device for a stroller, comprising:

a frame assembly including a handle frame and a rear frame having wheels mounted thereon;

a joint including a first arm and a second arm pivotally linked with each other, the first arm is fixed with the handle frame, the second arm is movable between a first position and a second position, the second arm is normally at the first position;

a handle mounted on the second arm so that the handle is pushed downward to change the second arm from the first position to the second;

a brake assembly, mounted on the rear frame near the rear wheel, capable of providing a brake position where the rear wheel is precluded to rotate, and a release position where the rear wheel is free to rotate, the brake assembly is normally in the brake position; and a pulling wire, by one end thereof connecting to the joint, and the other end thereof connecting to the brake assembly, wherein the brake assembly is moved from the brake position to the release position when the second arm is moved from the first position to the second position.

2. A brake device for a stroller as recited in claim 1, wherein the wheel has a shaft for pivotally mounting on the rear frame.

3. A brake device for a stroller as recited in claim 1, wherein the wheel comprises a brake block formed with a plurality of grooves around an axle of the wheel.

4. A brake device for a stroller as recited in claim 1, wherein a slot is formed on the rear frame near the brake assembly.

5. A brake device for a stroller as recited in claim 4, wherein the brake assembly comprises:

a slidable sleeve, slidably mounted on the rear frame;

a brake bar, penetrating through the slidable sleeve and the slot of the rear frame to make the slidable sleeve movable on the slot of the rear frame, and selectively positioning in the bottom end of the slot which is defined as the first position for precluding rotation of the rear wheel, and positioning in the top end of the slot which is defined as the second position for free rotation of the rear wheel; and a resilient element, by one end thereof connecting to the brake bar, and another end thereof connecting to the axle of the rear wheel, for normally positioning the brake bar in the first position.

* * * * *